(12) United States Patent
Greene et al.

(10) Patent No.: US 10,963,971 B1
(45) Date of Patent: Mar. 30, 2021

(54) OVERSPENDING ALERT SYSTEM

(71) Applicant: Wells Fargo Bank, N.A., San Francisco, CA (US)

(72) Inventors: Eric Greene, Piedmont, CA (US); Simone Harvey, Berkeley, CA (US); Adnan Khan, San Francisco, CA (US); Ajit Limaye, Portland, OR (US); Evelyn Ujanen, San Francisco, CA (US); Paul Vittimberga, Oakland, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 105 days.

(21) Appl. No.: 15/489,495

(22) Filed: Apr. 17, 2017

(51) Int. Cl.
*G06Q 40/00* (2012.01)
*H04L 29/06* (2006.01)

(52) U.S. Cl.
CPC ............. *G06Q 40/12* (2013.12); *H04L 63/10* (2013.01)

(58) Field of Classification Search
USPC .............................................. 705/30, 38, 39
See application file for complete search history.

(56) References Cited

U.S. PATENT DOCUMENTS

| | | |
|---|---|---|
| 7,478,062 B2 | 1/2009 | Ansley |
| 8,027,891 B2 | 9/2011 | Preston et al. |
| 9,384,493 B2 | 7/2016 | Harris et al. |
| 2010/0250419 A1 | 9/2010 | Ariff et al. |
| 2012/0197773 A1 | 8/2012 | Grigg et al. |
| 2013/0024364 A1* | 1/2013 | Shrivastava ......... G06Q 20/407 705/39 |
| 2013/0030994 A1* | 1/2013 | Calman ................. G06Q 30/02 705/40 |
| 2013/0036047 A1 | 2/2013 | Busher |
| 2013/0041819 A1 | 2/2013 | Khasho |
| 2014/0156501 A1* | 6/2014 | Howe .................. G06Q 40/025 705/38 |
| 2015/0073952 A1 | 3/2015 | Ventura et al. |

(Continued)

OTHER PUBLICATIONS

Sherman, "This App Warns You and Your Friends When You're on the Verge of a Splurge", Digital Trends, 2016. 4 pages.

(Continued)

*Primary Examiner* — Dennis W Ruhl
*Assistant Examiner* — Reva R Moore
(74) *Attorney, Agent, or Firm* — Foley & Lardner LLP

(57) ABSTRACT

A financial institution computing system includes a network interface structured to communicate data over a network, a user database configured to store information to a plurality of users, and a processing circuit comprising a processor and a memory. The memory is structured to store instructions that are executable by the processor and cause the processor to retrieve a user transaction history associated with the user payment account from the user database, determine a baseline level of user spending based on the user transaction history, receive, by the network interface, user activity information pertaining to the user, determine that the received user activity information is indicative of a predetermined level of user spending relative to a baseline level of user spending, and transmit, by the network interface, an alert to a user computing device associated with the user responsive to the determination.

17 Claims, 4 Drawing Sheets

(56) References Cited

U.S. PATENT DOCUMENTS

2015/0221044 A1 8/2015 Ariff et al.
2016/0048928 A1 2/2016 Davis et al.
2016/0253702 A1 9/2016 Gonzales, Jr.

OTHER PUBLICATIONS

Sherman, "This App Warns You and Your Friends When You're on the Verge of a Splurge", Digital Trends, 2016.

* cited by examiner

OVERSPENDING ALERT SYSTEM

TECHNICAL FIELD

The present invention relates generally to the field of financial budgeting tools, and more specifically to alerts for financial budgeting tools.

BACKGROUND

People tend to spend more than they intend to in various situations. For example, a particular user may tend to overspend at a particular location or at a particular time of the week. At the time of the user's overspending, the user may fail to take into account budgetary constraints or fail to internalize the amount that has been spent.

SUMMARY

One embodiment relates to a financial institution computing system associated with a financial institution. The system includes a network interface structured to communicate data over a network. The system also includes a user database configured to store information to a plurality of users, including information pertaining to a user payment account associated with a user and historical user activity data pertaining to the user, the historical user activity information pertaining to the user being stored in association with a unique user identifier. The system also includes a processing circuit comprising a processor and a memory, the memory structured to store instructions that are executable by the processor and cause the processor to retrieve a user transaction history associated with the user payment account from the user database. The instructions also cause the processor to determine a baseline level of user spending based on the user transaction history. The instructions also cause the processor to receive, by the network interface, user activity information pertaining to the user. The instructions also cause the processor to determine that the received user activity information is indicative of a level of user spending that is above the baseline level of user spending. The instructions also cause the processor to transmit, by the network interface, an alert to a user computing device associated with the user responsive to the determination.

Another embodiment relates to a computer-implemented method. The method includes retrieving, by a financial institution computing system associated with a financial institution, a user transaction history associated with a user payment account associated with a user from a database. The method also includes determining, by the financial institution computing system, a baseline level of user spending based on the user transaction history. The method also includes receiving, by the financial institution computing system, user activity information pertaining to the user. The method also includes determining, by the financial institution computing system, that the received user activity information is indicative of a level of user spending that is above the baseline level of user spending. The method also includes transmitting, by the financial institution computing system, an alert to a user computing device associated with the user responsive to the determination.

Another embodiment relates to a non-transitory computer-readable media having computer-executable instructions embodied therein that, when executed by a processor of a financial institution computing system associated with a financial institution, causes the financial institution computing system to perform operations to transmit an overspending alert to a user. The operations include retrieving a user transaction history associated with the user payment account from associated with the user a database. The operations also include determining a baseline level of user spending based on the user transaction history. The operations also include receiving user activity information pertaining to the user. The operations also include determining that the received user activity information is indicative of a level of user spending that is above the baseline level of user spending. The operations also include transmitting an alert to a user computing device associated with the user responsive to the determination.

DETAILED DESCRIPTION

Figure 1:
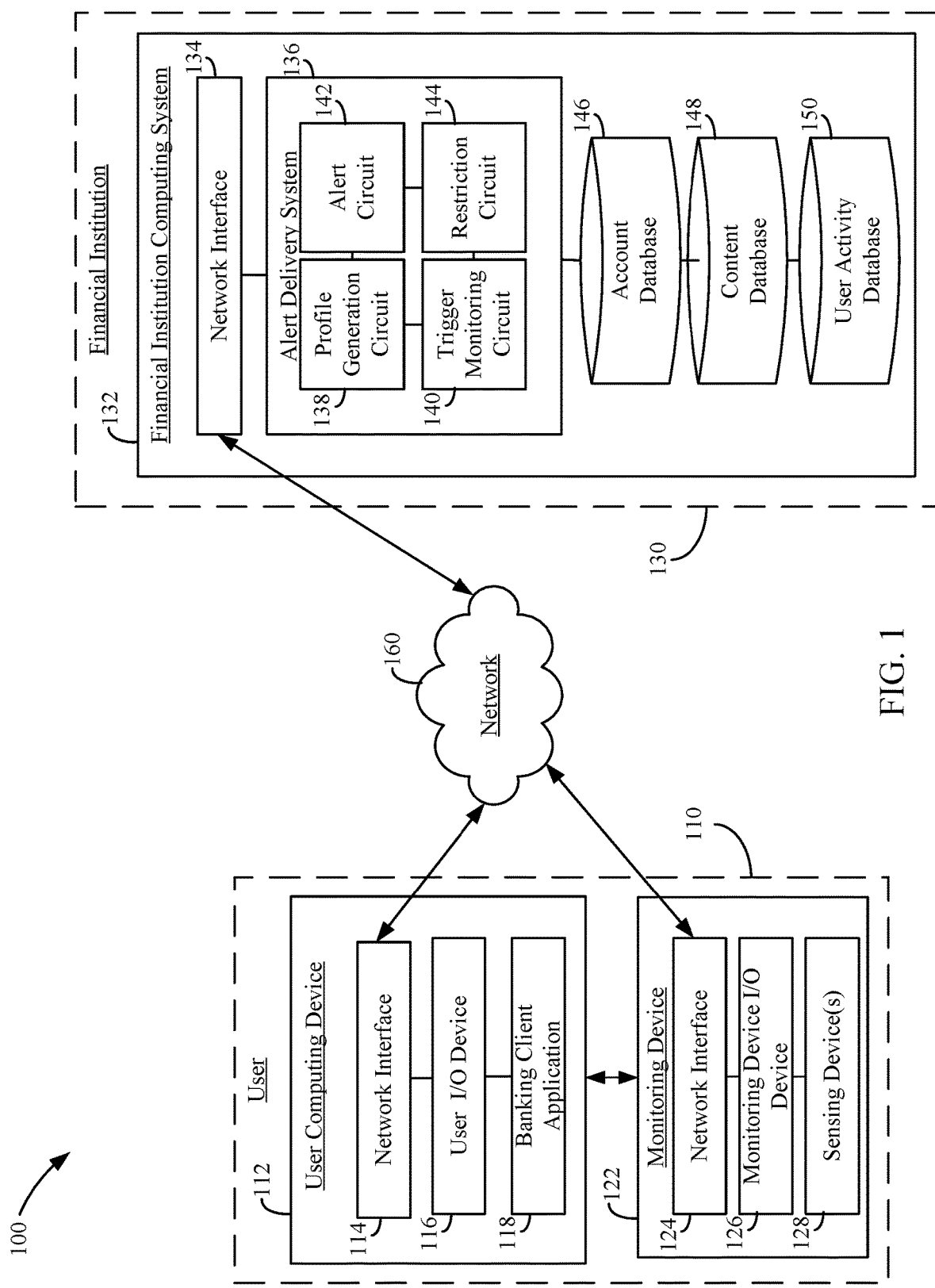
FIG. 1 is a block diagram of an overspending alert system, according to an example embodiment.

Referring generally to the figures, various systems, methods, and apparatuses for alerting a user of an overspending potential through an overspending alert system are described herein. More particularly, systems and methods for facilitating the prevention of user overspending through providing situational alerts are described herein.

According to various example embodiments, an alert program at a financial institution is maintained and facilitated by an overspending alert system described herein. The overspending alert system manages the delivery of alerts to various users in certain situations. In one arrangement, a user may agree to participate in the alert program offered by the financial institution. Alternatively, the user may be prompted by the financial institution to participate in the alert program by the financial institution (e.g., when the user opens an account at the financial institution). When referred to herein, the term "alert program" includes arrangements between a financial institution and various users whereby the financial institution sends alerts to registered users in certain circumstances. The systems, methods, and apparatuses herein are applicable to any situation where a user receives any sort of preventative communication regarding user spending.

The embodiments described herein solve the technical and internet-centric problem of providing users with dynamic, individually-tailored spending alerts. This is done by combining user financial information with various other user activity information (e.g., social media information, location information, biometric information) to identify a set of spending triggers for an individual user. By leveraging user financial information and user activity information, the systems, methods, and apparatuses herein assemble unique information sets. In this regard, the systems, methods, and apparatuses described herein integrate previously unconnected data to provide preventative communications to the benefit of various users. Accordingly, users can potentially avoid overspending in situations where it occurred previously. Additionally, the individually-tailored spending alerts may also be transmitted to others associated with the user (e.g., parents, guardians,) and enable others to take an action (e.g., placing a temporary hold on an account) to prevent the user's overspending. Thus, multiple steps to prevent user overspending can be taken.

As used herein, the term "user activity information" refers to any sort of data that is descriptive of any sort of action taken by a user. Information describing a user's location, the user's physiological state (e.g., heartrate, blood pressure, body temperature, sleep monitoring data, and the like), and the user's movements (e.g., a step counter) can all be accurately described as "user activity information" as used herein. Further, information describing user communications (e.g., user text messaging and phone call data, web browsing histories, social media postings) are also within the scope of the term. Additionally, the term "user activity information" also includes any of the information discussed above pertaining to other individuals that may be associated with the user (e.g., family members, social media connections, individuals designated as such by the user).

An example implementation may be described as follows. A user having an account at a financial institution registers for an alert program provided by the financial institution. During the registration process, the user may be prompted to allow the financial institution to access certain forms of user activity data (e.g., user social media information, user location information, user biometric information). After the user's registration, the financial institution, by an associated financial institution computing system, monitors the user's transaction history as well as the user activity data. Based on the user's transaction history, the financial institution computing system determines the user's baseline spending habits (e.g., identifying the timing, location, and amounts of various user spending events). The financial institution computing system also identifies times when the user's spending deviates from the user's baseline spending habits. Interrelationships between these deviations and the received user activity information are then used to generate a set of user spending triggers—sets of user activity information that have been determined to correlate with an increased level of user spending via the methods disclosed herein—for the user. The financial institution computing system continues to monitor the user activity data and, if a spending trigger is detected, an alert may be transmitted to a user computing device associated with the user prior to any user spending takes place. Thus, the user is provided with an alert prior to engaging in any harmful spending activities.

Referring now to FIG. 1, a block diagram of an overspending alert system 100 is shown, according to an example embodiment. As will be described in further detail below, the overspending alert system 100 facilitates the delivery of alerts to a user 110. The overspending alert system 100 receives various forms of information regarding the user 110 to determine times when the user 110 is susceptible to overspend. When such times are detected, the over spending alert system 100 transmits a targeted overspending alert to the user 110 to prevent the user from overspending.

The user 110 includes any type of entity capable of being monitored and engaging in a transaction. In some arrangements, the user 110 is an individual holding an account at a financial institution 130. In some arrangements, the financial institution 130 offers an alert program to the user 110. The financial institution 130 may include commercial or private banks, credit unions, investment brokerages, or the like.

The overspending alert system 100 includes a user computing device 112, a monitoring device 122 associated with the user 110, a financial institution computing system 132 associated with the financial institution 130, whereby these components are communicably coupled to each other over a network 160. The network 160 provides communicable and operative coupling between the user computing device 112 and the financial institution computing system 132, and other components disclosed and described herein to provide and facilitate the exchange of communications (e.g., data, instructions, messages, values, commands). The network 160 is a data exchange medium, which may include wireless networks (e.g., cellular networks, Bluetooth®, WiFi, Zigbee®), wired networks (e.g., Ethernet, DSL, cable, fiber-based), or a combination thereof. In some arrangements, the network 160 includes the Internet. In some embodiments, the network 160 may further include a proprietary banking network to provide secure or substantially secure communications.

The user computing device 112 is a computing device associated with the user 110. The user computing device 112 includes any type of computing device that may be used to receive information from the financial institution computing system 132. In some arrangements, the user 110 uses the user computing device 112 to communicate with various third party computing systems (not shown). Third party computing systems may, for example, provide a social media platform enabling the user to communicate with various other users, a search engine enabling the user to locate and access information, and the like. In this regard, the user computing device 112 may include any wearable or non-wearable device. Wearable devices refer to any type of device that an individual wears including, but not limited to, a watch (e.g., smart watch), glasses (e.g., eye glasses, sunglasses, smart glasses), bracelet (e.g., a smart bracelet), etc. User computing device 112 may also include any type of mobile device including, but not limited to, a phone (e.g., a smart phone), tablet, personal digital assistant, and/or computing devices (e.g., desktop computer, laptop computer, personal digital assistant).

In the example embodiment shown, the user computing device 112 includes a network interface 114 enabling the user computing device 112 to exchange information over the network 160, a banking client application 118, and a user input/output ("I/O") device 116. The user I/O device 116 includes hardware and associated logics configured to enable the user computing device 112 to exchange information with the user 110. An input device or component of the user I/O device 116 allows the user 110 to provide information to the user computing device 112, and may include, for example, a mechanical keyboard, a touchscreen, a microphone, a camera, a fingerprint scanner, any user input device engageable with the user computing device 112 via a USB, serial cable, Ethernet cable, and so on. An output device or component of the user I/O device 116 allows the user 110 to receive information from the user computing device 112, and may include, for example, a digital display, a speaker, illuminating icons, LEDs, and so on.

The banking client application 118 is structured to provide displays to the user computing device 112 that enable the user 110 to manage financial accounts. Accordingly, the banking client application 118 is communicably coupled to the financial institution computing system 132 (e.g., alert delivery system 136, the account database 146, the content database 148, and the user activity database 150) and is structured to permit management of the customer financial accounts and transactions. The displays provided by the banking client application 118 may be indicative of current account balances, pending transactions, profile information (e.g., contact information), and the like. Further, in some embodiments, the banking client application 118 also is structured to present displays pertaining to an alert program to the user 110. Alert program displays include, for example, alerts that indicate to the user 110 that the alert delivery system 136 has determined that the user 110 is currently susceptible to overspending. Further, as will be described below, alert program displays may also enable the user to place restrictions on a user payment account as measure to further prevent the user 110 from overspending.

In some embodiments, the banking client application 118 is a separate software application implemented on the user computing device 112. The banking client application 118 may be downloaded by the user computing device 112 prior to its usage, hard coded into the memory of the user computing device 112, or be a web-based interface application such that the user computing device 112 may provide a web browser to the application, which may be executed remotely from the user computing device 112. In the latter instance, the user 110 may have to log onto or access the web-based interface before usage of the applications. Further, and in this regard, the banking client application 118 may be supported by a separate computing system including one or more servers, processors, network interface circuits, etc. that transmit applications for use to the user computing device 112. In certain embodiments, the banking client application 118 includes an API and/or a software development kit (SDK) that facilitates the integration of other applications (e.g., a social media application) with the banking client application 118.

The monitoring device 122 is configured to monitor the user 110 to generate user activity information. The monitoring device 122 may include any type of equipment capable of acquiring information regarding certain activities of the user 110. For example, the monitoring device 122 may include any device capable of collecting location information, movement information, biometric information, a psychological characteristic of the user 110, and so on. As shown, the monitoring device 122 includes a monitoring device network circuit 124 enabling the monitoring device 122 to exchange data over the network 160, a sensing device 128, and a monitoring I/O device 126 configured to communicate data with the user 110 via hardware and associated logics similar to those discussed above with respect the user I/O device 116.

The monitoring device 122 may include a plurality of sensing devices 128 configured to monitor various aspects of user activities. As an example, the monitoring device 122 may include a wearable that is worn around an ankle or wrist of the user that includes a sensing device 128 that monitors activities such as running and walking (e.g., by counting the user's steps, measuring the user's speed). As another example, the monitoring device 122 may include a wearable that includes a sensing device 128 that monitors heart activity (e.g., heart rate, etc.). As another example, the monitoring device 122 may include a device that is not mobile (not carried with the user) when it is utilized. For example, the monitoring device 122 may be a device fixedly mounted inside or outside of a building (e.g., a home security camera or proximity sensor that is fixedly mounted inside a home of the user, a traffic camera,). In various other example embodiments, the sensing device 128 may include a microphone, a camera, a motion sensor, a Lidar device, a radar device, an ultrasound device, a blood pressure sensor, a thermometer, a gyroscope, a pitot tube, a piezoelectric sensor, a security camera, dashboard camera, motion detector, and the like.

In some embodiments, the monitoring device 122 includes program logic stored in a system memory of the monitoring device 122 (not shown). The program logic may include, for example, an application programming interface (API) that configures the monitoring device 122 to transmit user activity information to the user computing device 112 and/or financial institution computing system 132 for storage in the user activity database 150. As will be described below, this stored user information may be used by the financial institution computing system 132 to identify times when the user is susceptible to overspending.

In some embodiments, there are multiple monitoring devices 122 associated with the user 110. In an example, each monitoring device 122 gathers a separate form of user activity information. For example, one monitoring device 122 may monitor the user 110's steps while another may capture images of the user 110. In some embodiments, the monitoring device 122 is incorporated into the user computing device 112 and no additional monitoring devices 122 are included in the system 100.

Still referring to FIG. 1, the financial institution computing system 132 is a computing system associated with the financial institution 130. In the example embodiment shown, the financial institution computing system 132 includes a financial institution network interface 134 enabling the financial institution computing system 130 to exchange data over the network 160, an alert delivery system 136, an account database 146, a content database 148, and a user activity database 150.

The user activity database 150 is structured to retrievably store user activity information received from the monitoring device 122, user computing device 112, and other sources. The user activity database 150 may include non-transient data storage mediums (e.g., local disc or flash-based hard drives, local network servers, and the like) or remote data storage facilities (e.g., cloud servers). The user activity database 150 stores various types of user activity information. As will be appreciated, the activity information stored in association with a particular user 110 varies depending on the nature of the monitoring devices 122 that the financial institution computing system 132 has access to. For instance, via a registration process described in more detail below, the user may limit the financial institution 130's access to certain forms of user activity information (e.g., the user may deny the banking client application 118 access to a camera on the user computing device 112). With respect to multiple different users, however, the user activity database 150 may store user biometric information (e.g., user heart-rate information, user blood pressure information, user body temperature information), other information regarding user activities (e.g., information regarding user movements such as steps, information regarding user locations), information regarding other individuals associated with the user 110 (e.g., user social media connections that have also registered for the alert program offered by the financial institution 130), and images of the user (e.g., periodic images captured by a camera included on the user computing device 112).

In some embodiments, the user activity database 150 maintains a separate data entry for each user registered for the alert program. Each user entry may be stored in association with a unique user identifier. As used herein, the term "unique user identifier" refers to identification associated with a particular user 110 that has registered for an alert program provided by the financial institution 130. When the user 110 registers for the alert program and provides the financial institution 130 with access to various monitoring devices 122, this same unique user identifier may be transmitted to any monitoring devices 122 and/or user computing device 112 that transmit user activity information to the financial institution computing system 132. In various example embodiments, whenever user activity data is transmitted to the financial institution computing system 132 by, for example, the user computing device 112, this unique user identifier is included. Additionally, separate identifiers may also be assigned to each device (e.g., the user computing device 112 and any monitoring devices 122) associated with the user 110.

In some embodiments, each user entry in the user activity database 150 includes a plurality of sub-entries, with each sub-entry being associated with a particular form of user activity information (e.g., collected from a different type of sensing device 128 or from a different data source). Each sub-entry may include a plurality of activity entries having associated timing stamps. The activity entry may describe an aspect of the user (e.g., the user's location) and the time stamp describes the time that the data resulting in the activity entry was received by the financial institution computing system 132 (or when the data was recorded by the sensing device 128). As another example, a monitoring device 122 that monitors the user 110's movements may transmit an hourly dataset to the financial institution computing system 132 describing the number of steps and average speed of the user 110 during the previous hour. In a "user movement" sub-entry of user 110's entry in the user activity database 150, each hourly entry may include a timestamp, a "steps" column quantifying the number of steps, and an "average user speed" column indicating an average user walking speed. Another sub-entry may contain information regarding user biometric data. For example, a "user heartrate" sub-entry may include average user heartrates measured by a monitoring device 122 over various time intervals.

In various embodiments, the alert delivery system 136 may process received user activity information prior to an entry in the user activity database being created. For, example, if the user 110 posts on social media and the post is shared with the financial institution computing system 132, the alert delivery system 136 may perform a textual analysis on the post to determine a topic of the post prior to storing the topic in association with a time of the post in a social media sub-entry in the user activity database 150. In another example, if the alert delivery system 136 receives information pertaining to a search query that the user 110 input into a search engine, the alert delivery system 136 may determine if the query pertains to a product and, if so, access a database to determine the price of the product. The identified product/price combination may be stored in the user activity database 150.

The content database 148 is structured to store content that may be used to generate overspending alerts that are transmitted to the user 110. The content database 148 may include non-transient data storage mediums (e.g., local disc or flash-based hard drives, local network servers) or remote data storage facilities (e.g., cloud servers). In some arrangements, the content database 148 stores a number of different alert messages. In some arrangements, each alert message may be associated with a particular type of overspending trigger. For example, there may be a location-based overspending message for situations when a location-based user overspending trigger is detected via the methods below. In some arrangements, each alert message may include fields into which various components can be inserted. The alert delivery system 136 may populate such fields with entries that are specifically tailored to the situation of the user 110. Accordingly, the content database 148 may also store various message components that may be used to populate these fields. For example, the content database 148 may include a plurality of location names that are stored in association with location coordinates. This way, if the user is detected to be at or near the location coordinates, the alert delivery system 136 retrieves the location name and populates a location field in the alert message. In another example, the content database 148 may include the names of various other users that may be used to populate a companion field in the alert message.

The account database 146 is structured to retrievably store information pertaining to a payment account held by the user 110 at the financial institution 130. The account database 146 may include non-transient data storage mediums (e.g., local disc or flash-based hard drives, local network servers) or remote data storage facilities (e.g., cloud servers). The account database 146 may include personal customer information (e.g., names, addresses, phone numbers), identification information (e.g., driver's license numbers, standard biometric data), and customer financial information (e.g., token information, account numbers, account balances, available credit, credit history, transaction histories). In some arrangements, the account database 146 includes information pertaining to a user spending profile generated by the alert delivery system 136 described below.

The alert delivery system 136 is structured to manage an overspending alert program for the user 110. In this regard, the alert delivery system 136 is configured to receive information input by the user into the user computing device 112, receive user activity data captured by the monitoring device 122 and/or user computing device 112, generate a user spending profile based on the received information, monitor user activity data received from the monitoring device 122 to determine when to deliver an alert to the user, use content stored in the content database 148 to generate alerts to be transmitted to the user, and respond to any spending control commands received from the user computing device 112.

Accordingly, the alert delivery system 136 is communicatively coupled to the network interface 134, the account database 146, content database 148, and user activity database 150.

As shown, the alert delivery system 136 includes a profile generation circuit 138, a trigger monitoring circuit 140, and alert circuit 142, and a restriction circuit 144. In various arrangements, the activities of one circuit may be combined with the activities of another circuit. As shown, the various circuits 138-144 may be embodied within a system memory of a processing circuit of the financial institution computing system 132 (not shown). However, other embodiments of the alert delivery system 136 are envisioned. For example, each of the circuits 138-144 may be embodied as separate processing circuits that may or may not be geographically dispersed from one another. For example, any of the circuits 138-144 may be implemented at the user computing device 112 (e.g., as a part of the banking client application 118). In some embodiments, some of the circuits 138-144 are at the financial institution computing system 132 while others are installed on the user computing device 112. Thus, the depiction and explanation contained herein is for exemplary purposes only.

The profile generation circuit 138 is configured to generate a spending profile for the user 110. In various embodiments, the spending profile includes a set of user overspending triggers that are generated based on the user's transaction history (e.g., stored in association with a user payment account in the account database 146) and user activity data either received from the user devices (e.g., the user computing device 112 or the monitoring device 122) or stored in the user activity database 150.

In various example embodiments, the user overspending triggers are identified via a multi-step process involving an initial assessment of the user 110's account information. The initial assessment involves a determination of a user baseline spending level. In various arrangements, the initial assessment may generate a baseline user spending level using a plurality of different methodologies. In one example, the profile generation circuit 138 may generate a periodic budget for the user 110. The budget may identify suggested spending amount for a predetermined time period (e.g., a day, a week, a month) based on information stored in association with a user account in the account database 146. For example, the profile generation circuit 138 may assess historical user account balance trends (e.g., withdrawal trends, deposit trends) to project a user income level, and generate a suggested user spending level based on the projected income by accessing a lookup table.

In another example, the profile generation circuit 138 generates a historical baseline spending level of the user 110 based on the user's transaction history stored in the account database 146. Based on the information stored at the account database 146, which may identify the timing, amounts, and merchants of various previous user transactions, the profile generation circuit 138 may identify an average level of user spending over a predetermined period. Alternatively or additionally, the profile generation circuit 138 may identify a spending range (e.g., $300 to $500) into which a predetermined percentage (e.g., 80%) of user weekly spending levels fall.

After the user baseline spending level is determined, the profile generation circuit 138 may characterize various other aspects of the user 110's spending. In one embodiment, the profile generation circuit 138 identifies a set of merchants that the user 110 most commonly shops at. For example, the profile generation circuit 138 may divide the user 110's transaction history into temporal increments (e.g., weeks), and identify merchants at which the user 110 engaged in a transaction in more than a predetermined percentage of those increments. Having identified a common set of merchants for the user 110, the profile generation circuit 138 may next characterize the user 110's transactions at those merchants. For example, the profile generation circuit 138 may identify an average transaction amount or most common transaction amount for each of the identified merchants.

Having identified various characteristics of the user's most common spending habits, the profile generation circuit 138 may next identify deviations from those spending habits. For example, the profile generation circuit 138 identifies time intervals (e.g., particular weeks) where the user 110's spending level rose above the user's baseline spending level by more than a predetermined amount (e.g., 10% of the user's baseline spending level). Such situations are referred to herein as "user overspending intervals." Next, for those time intervals, the profile generation circuit 138 may identify particular transactions or series of transactions (herein called "user overspending transactions") during user overspending intervals that caused the increased amount of user spending. For example, the profile generation circuit 138 may identify a transaction at a merchant not commonly shopped at by the user 110 or a transaction having an amount above what the user normally spends at a particular merchant. Alternatively or additionally, the profile generation circuit 138 may identify a series of user transactions at a combination of merchants not commonly shopped at by the user.

Having identified periods of increased user spending and the underlying transactions that caused such increases, the profile generation circuit 138 generates a set of overspending triggers for the user 110. Such overspending triggers may be generated based on the user activity data stored in the user activity database 150. As discussed above, the user activity database 150 may include an entry specifically for the user 110 containing a number of time stamps associated with various user activity entries. Thus, in some embodiments, to identify potential user overspending triggers, the profile generation circuit 138 may compare the time stamps for each activity entry to the timing of the user overspending intervals. If the timing of a particular activity entry is within a predetermined threshold of the overspending transaction or set of transactions, for example, the profile generation circuit 138 identifies the activity entry as being a user overspending trigger. If the profile generation circuit 138 cannot identify any user overspending triggers (e.g., if none of the activity data stored in the user activity database 150 sufficiently correlates to the user overspending events), then the profile generation circuit 138 may re-perform the above analysis using a more lenient threshold. Such a process may be repeated until the threshold reaches a maximum allowable threshold preconfigured by the financial institution 130.

In some arrangements, rather than identifying certain user activities as overspending triggers and other user activities as not being overspending triggers, the profile generation circuit 138 rates all available sets of user activity information based on correlations with user spending. For example, each set of user activity information may receive a rating from one to ten, with one indicating that there is relatively low correlation between that user activity and an enhanced level of user spending, and ten indicating a strong correlation. For example, if the profile generation circuit 138 determines that the user 110 spends relatively little amounts of funds at a particular location, that location may receive a one. In another example, if the profile generation circuit 138 determines that the user 110 always engages in an overspending transaction at a particular location (e.g., a bar, restaurant), such a location may receive a ten. Other sets of user having more moderate correlations with user overspending transactions may receive moderate ratings. In some arrangements, each set of user activity data having a rating above a threshold rating (e.g., five) may be set as a user overspending trigger.

In some arrangements, the profile generation circuit 138 may continuously update the user 110's spending profile based on updated financial and activity information received after the user's initial profile is created. For example, if the user 110's income decreases (e.g., as indicated by a lower direct deposit in the user 110's account), the user's baseline spending level may be updated and the user's overspending triggers may be re-determined. To illustrate, if a particular user's income decreases, the threshold rating discussed above may drop such that more sets of user activity information are set as user overspending triggers. Thus, the user 110 will be alerted more frequently as a result of having tighter budget constraints.

In some embodiments, certain overspending triggers may be determined based on potential user overspending transactions. For example, certain user activity information (e.g., a user searching history at a search engine) may indicate that the user 110 is interested in a product that, if purchased, would constitute a user overspending transaction. In other words, adding the purchase price of a particular product to the user's baseline spending levels (e.g., for food, rent, etc.) would cause the user 110 to spend more than an advised amount. Accordingly, the profile generation circuit 138 may assess user activity information to identify potential user purchases. For example, user web browsing histories may be assessed to identify any potential products that the user is interested in purchasing and their associated costs. Additionally, other user activity data (e.g., user social media data) may be assessed to determine more general user interests (e.g., hobbies). Based on the user 110's interests, a set of merchants and associated locations may be identified as user overspending triggers. For example, if the user 110's social media profile indicates that the user is a snowboarding enthusiast, the profile generation circuit 138 may identify the locations of merchants selling snowboarding equipment as user overspending triggers.

In some embodiments, the profile generation circuit 138 generates user overspending triggers based on the activity information of a combination of users registered for the alert program. For example, regarding a particular user 110, the profile generation circuit 138 may query the user activity database 150 for sets of activity data stored in association with other users that bear some relationship to the user 110. For example, upon receiving a set of location data describing the location of the user 110 at various times, the profile generation circuit 138 may query the user activity database 150 to identify other, similarly-located registered users. If another user is identified as being with the user 110 (e.g., if successive sets of location data received regarding the user 110 and the other user are within a predetermined distance threshold of one another) during a particular period, and that period corresponds with a time during which the user 110 spent more than a baseline spending level, the other user may be identified as an overspending trigger. In such a situation, whenever received location data associated with the user 110 matches that of the other user, an overspending alert may be transmitted to the user computing device 112 via the methods described herein.

Other users may also be identified as overspending triggers based on other types of user activity data. For example, after identifying time periods in which the user 110 spent more than a baseline amount, the profile generation circuit 138 may query the user activity database 150 for social media information pertaining to the user 110 transmitted at or just prior to the overspending period. The posts may have been posted by the user 110 or any other user of any social networking medium to which the financial institution 130 has access. The posts may describe events attended by the user 110 or describe various other aspects of the user (e.g., a viewpoint, a state of mind, an interest). If such posts are identified, the profile generation circuit 138 may further analyze the posts to identify any other user overspending triggers. To illustrate, an individual that attended an event also attended by the user 110 may be established as an overspending trigger such that, if the financial institution computing system 132 receives information regarding another association of the user 110 with that individual, the user 110 is provided with an overspending alert.

In some embodiments, the profile generation circuit 138 may generate user overspending triggers based on multiple forms of information stored in the user activity database 150. For example, when generating the profile of the user 110, the profile generation circuit 138 may query the user activity database 150 for social media posts bearing a relationship to the user 110. To illustrate, the profile generation circuit 138 may identify other users that are social media connections (e.g., "friends") of the user 110, and retrieve social media posts of those other users. After retrieval of the posts, the posts are assessed for any mention of the user 110. If any posts mention the user 110, those posts may be further assessed to identify any potential overspending triggers. For example, another user may indicate a desire to incur an expense with the user at a particular merchant (e.g., travel to a destination, attend an event, purchase a product, etc.). In such a case, a multi-condition overspending trigger may be established based on the social media post. "Multi-condition" overspending triggers are overspending triggers that require multiple conditions to be present in order for an alert to be transmitted. In this example, the multi-condition overspending trigger includes multiple location-based conditions. One location-based condition includes detecting that the user 110 is located at the merchant identified in the social media post. Another location-based condition includes detecting the user 110 is located with the user who initially made the post on social media. As such, if the user 110 is detected to be with the other user at a location consistent with a proposed transaction via social media, the user is delivered an overspending alert.

In some embodiments, the profile generation circuit 138 may generate user overspending triggers that are not determined using user activity information. Such overspending triggers may relate to user financial data stored in the account database 146. For example, based on user location information (e.g., a user address) and user account balance information, the profile generation circuit 138 may identify a set of overspending triggers associated with other users having similar information (e.g., similar wealth levels, similar income levels as indicated by account deposits, similar location information) to the user 110 to include in the user 110's profile. As an example, the profile generation circuit 138 may include as a spending trigger the location of a particular merchant at which other similar users tend to overspend. The overspending trigger may include a plurality of sets of locations proximate to the identified merchant such that, if the user's location information received from the user computing device 112 matches one of the sets, an overspending alert would be triggered.

In another example, the profile generation circuit 138 may identify other account holders that are similarly situated to the user (e.g., having similar incomes) that are in good financial health (e.g., having credit scores above a predetermined threshold, account balance histories never dropping below a certain threshold, and the like). Further, the profile generation circuit 138 may identify financial activities avoided by those users. For example, a set of merchant locations of merchants avoided by those users may be identified by assessing the transaction histories of each of those users to generate a list of merchants regularly shopped at by those users (e.g., merchants that are shopped at by a predetermined percentage of the identified user). The profile generation circuit 138 identifies the average transaction amount of the similar users at each of those merchants, and identifies another set of merchants having an average product price or transaction amount above the determined average amount to include in the user's overspending triggers.

In another example, certain user overspending triggers may be identified purely based on the user 110's transaction history stored at the account database 146. For example, upon detecting a time interval in which user spending rose above a baseline user spending level and the transactions that caused such a rise in user spending, the profile generation circuit 138 may access contextual information surrounding the identified transaction (e.g., the timing of the identified transaction, other transactions that the user 110 engaged in within a time period of the identified transaction). The profile generation circuit 138 may perform a similar analysis for all of the other identified time intervals in which the user's spending rose above the previously-identified baseline spending level. After performing such an analysis, the profile generation circuit 138 may detect patterns in the gathered contextual information. For example, if user overspending transactions tend to have similar timing (e.g., they occur every Friday evening), the profile generation circuit 138 may identify that particular timing as a user overspending trigger. In another example, if the profile generation circuit 138 determines that transactions at a particular type of merchant (e.g., a restaurant or a bar) tend to lead to user overspending transactions, the profile generation circuit 138 may identify those types of transactions as user overspending triggers. To illustrate, if the user 110 tends to overspend after performing an initial transaction at a bar, the profile generation circuit 138 may identify transactions in that category as being a user overspending trigger. In such a case, upon detecting the user 110 has engaged in a transaction at a bar, the alert delivery system 136 may transmit an alert to the user 110.

Once a set of user overspending triggers has been identified, the profile generation circuit 138 may store the set of user activity data that corresponds to the overspending trigger in relation to the user's account in the account database 146. Alternatively, the profile generation circuit 138 may update the data entry in the user activity database 150 to include an overspending trigger identifier.

The trigger monitoring circuit 140 is configured to monitor user activities for the user overspending triggers generated by the profile generation circuit 138. Accordingly, any user activity data received from the monitoring device 122 and/or user computing device 112 by the network interface 134 may be retrieved by the trigger monitoring circuit 140. As discussed above, such received user activity information may include a unique user identifier that is stored in association with the user's entry in the user activity database. Accordingly, upon receipt of user activity information, the trigger monitoring circuit 140 may run a comparison of the received user activity information to the user overspending triggers. If a sufficient correlation is found between the received user activity data and a user overspending trigger, a notification is delivered to the alert circuit 142 to trigger the delivery of an alert to the user 110. For example, via the various processes discussed above, the profile generation circuit 138 may determine that the user 110 tends to overspend during time periods after the user takes over a certain number of steps in an hour. In such an example, if user stepping data is received from a monitoring device 122 that indicates that the user 110 took over that number of steps, an alert may be transmitted to the user computing device 112.

The alert circuit 142 is configured to generate an overspending alert to transmit to the user computing device 112 over the network 160 responsive to the trigger monitoring circuit 140 detecting the occurrence of a user spending trigger. In various embodiments, the alert circuit 142 retrieves an alert message from the content database 148 to populate an alert template. As discussed above, the alert message that is retrieved may be based on the type of user overspending trigger detected. For example, if a user location-based overspending trigger is detected, a location-based alert message may be retrieved. Such an alert message may include one or more fields that can be populated with various other contents. For example, the alert message may read like "you are entering [location], you have a history of overspending here." To fill in the location field, the alert circuit 142 may retrieve a location name from the content database 148 that is stored in association with the user 110's detected location.

Having formulated the alert message, the alert circuit 142 may package the alert message with the unique user identifier associated with the user. In some embodiments, the alert circuit 142 may transmit the generated message to a push notification service which may in turn transmit a push notification to the user computing device 112 over the network 160 based on the unique user identifier. Alternatively, the alert circuit 142 may directly transmit the alert to the user computing device 112 without the intervention of the push notification service.

In various embodiments, the transmitted alert message discussed above may be specifically formatted such that when the alert message is received by the user computing device 112, a call for a particular function of the banking client application 118 is made by the program logic of the user computing device 112. The called function may cause the user 110 to be brought to a specific interface of the banking client application 118 upon the user 110 interacting with the alert message. For example, as described below, upon the user interacting with the received alert, the user may be brought to a display in the banking client application 118 that enables the user to place at least one restriction on the user's ability to use a payment account. For example, in one embodiment, the user is able to put a temporary hold (e.g., three hour) on the payment account.

It should be noted that other forms of alerts are contemplated. An alert directed to the user via any perceivable medium is consistent with the systems and methods disclosed herein. In this regard, the alert needn't include linguistic or alpha-numeric or symbolic content. The alert circuit 142 may transmit any signal configured to notify the user in any way as to an overspending potential.

The restriction circuit 144 is configured to place a restriction on the user's payment account responsive to the user 110 indicating such a preference via interacting with the banking client application 118. In this regard, the restriction circuit 144 receives a user input via the network interface 134 and puts a restriction on the user's account based on the input. For example, if the user 110 provides an input to the banking client application 118 to place a temporary hold on a user payment account, the restriction circuit 144 may notify other circuitry of the financial institution computing system 132 such as a payment processing circuit (not shown) to prevent the user 110 from being able to use the payment account to complete a transaction using the payment account. Once the time period of the temporary hold elapses, the restriction circuit 144 may again notify the payment processing circuit to enable the user to perform transactions with the payment account once again. Alternatively or additionally, the restriction circuit 144 may update the account database 146 such that the user payment account includes an inactivation identifier that prevents the payment processing circuit from approving any transactions attempted by the user. Once the period of the temporary hold elapses, the restriction circuit 144 may remove the inactivation identifier.

The restriction circuit 144 may perform various other operations if the user 110 places another type of restriction on the payment account. For example, in one embodiment, the user 110 can place a temporary spending limit on the payment account over a predetermined period. In such an embodiment, the user 110 may identify a spending amount threshold (e.g., $100) and a time period (e.g., five hours) for the spending limit. Accordingly, upon receipt of such inputs, the restriction circuit 144 is configured to monitor user transactions using the payment account over the indicated time period and, if the total amount of the transactions reaches the spending threshold, take steps to prevent the user from engaging in further transactions by any of the methods described above.

Figure 2:
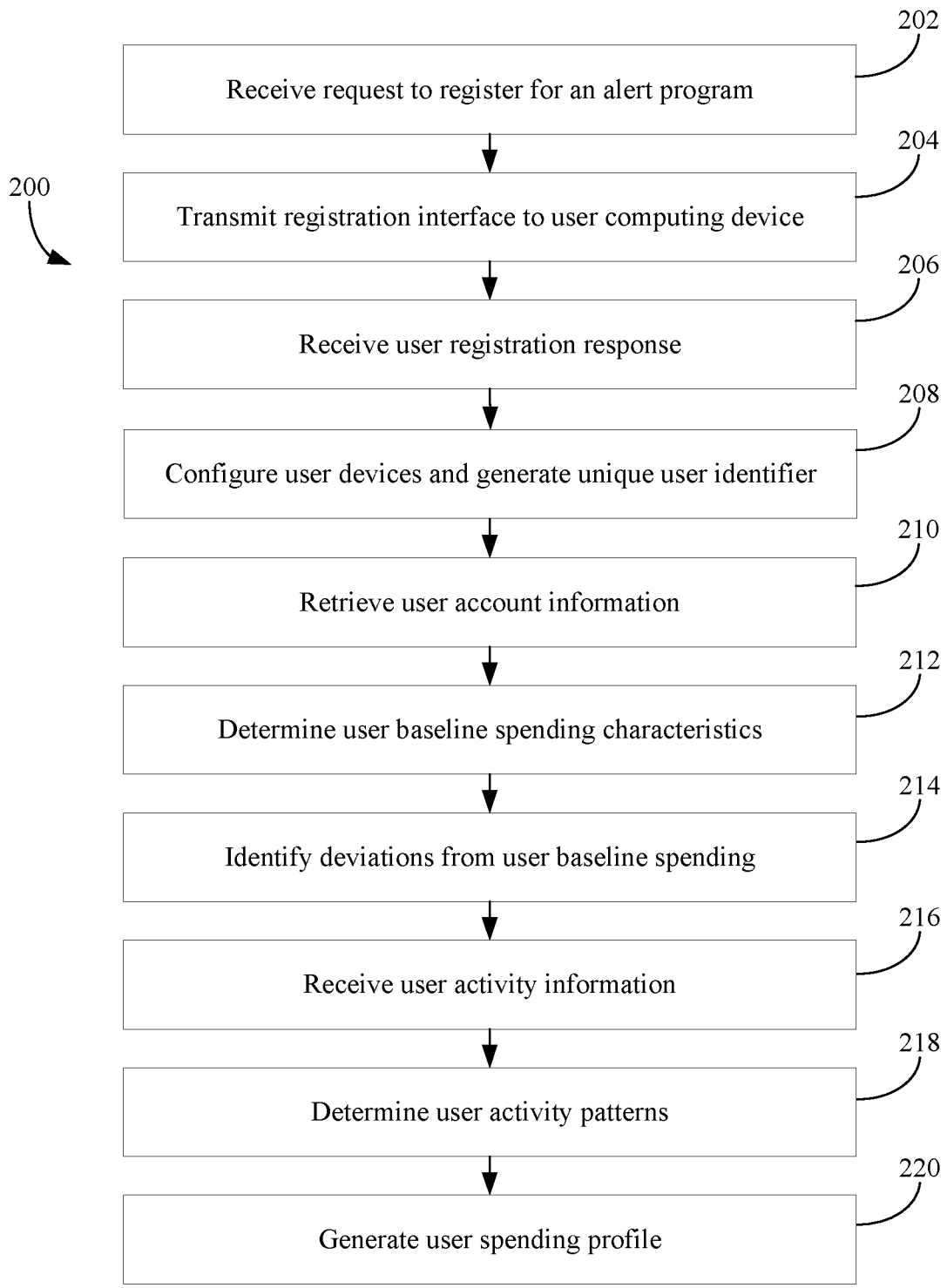
FIG. 2 is a flow diagram of a method of generating a user overspending profile, according to an example embodiment.

Referring now to FIG. 2, a flow diagram of a method 200 of registering a user for an alert program is shown, according to an example embodiment. The method 200 may be performed by the components of FIG. 1, such that reference may be made to one or more components of FIG. 1 to aid description of the method 200.

A user request to register for the alert program is received at 202. In one example, the user 110, via a web browser on the user computing device 112, may access a website associated with the financial institution 130 and be brought to a webpage including a description of the alert program and a button configured to receive a user input to register for the alert program. Upon the user 110 pressing the button, the financial institution computing system 132 may receive the user preference via the network 160. In another example, the user 110 may access the banking client application 118 on the user computing device 112 to perform a mobile banking action. The banking client application 118 may include a button similar to the webpage discussed above. In yet another example, a user preference to register for the alert program may be inferred by the financial institution computing system 132 based on information stored at the account database 146. For example, if the user overdraws a user payment account or brings an account balance associated with the user payment account below a predetermined threshold, the method 200 may advance to step 204 automatically without receiving a request to register directly from the user.

A registration interface is transferred to the user computing device 112 at 204. In various example embodiments, responsive to the user preference to register being received at 202, the alert delivery system 136 transmits the registration to the user computing device 112 over the network 160. The registration interface may be a web page including a plurality of fields into which the user may input various forms of information. In an example, the registration interface enables the user 110 to identify user overspending triggers. This may include merchants at which the user tends to overspend, persons with which the person tends to overspend, the timing of various user overspending events, and the like. The registration interface may also prompt the user to identify any types of monitoring devices 122 possessed by the user, and provide the financial institution 130 with access to information captured by any monitoring devices 122. For example, the registration interface may ask the user for permission to access a camera and/or GPS sensor included on the user computing device 112. The registration interface may also ask the user for access to other forms of information associated with the user computing device 112 such as information pertaining to other applications (e.g., social media applications, shopping applications) on the user computing device 112.

User registration responses are received at 206. In various example embodiments, the information entered by the user (e.g., via the user I/O device 116) into the various fields of the registration interface is transmitted from the user computing device 112 to the alert delivery system 136 over the network 160 via the network interface 134. Upon receipt of the user information, the alert delivery system 136 may identify various user preferences. For example, the alert delivery system 136 may identify any monitoring devices 122 and/or other information sources that the user has permitted the alert delivery system 136 to access.

User devices are configured and a unique user identifier is generated at 208. Upon identifying the information sources that the user permitted access to, the alert delivery system 136 may transmit a software package to the user computing device 112 over the network 160. The software package, for example, may serve as an update for a banking client application 118 on the user computing device 112 or comprise a separate alert application on the user computing device 112. The software package may include various application programming interfaces (APIs) that configure various monitoring devices 122 to share information with the financial institution computing system 132, banking client application 118 and/or separate alert application. For example, one API may configure a GPS locator on the user computing device 112 to share the user's current location with the banking client application 118. Another API may cause a monitoring device 122 to transmit information to the user computing device 112 that is accessible to the banking client application 118 (e.g., a user activity tracker may transmit user heartbeat information to the user computing device 112 for storage with an associated application, which may in turn provide the information to the banking client application 118). Other APIs may cause other forms of information to be accessible. For example, another API may enable the banking client application 118 to access user social media information stored in association with a social media application on the user computing device 112.

In some embodiments, the configuration of the user computing device 112 and monitoring devices 122 includes the transmittal of a unique user identifier to the devices. As discussed above, the unique user identifier may be used to uniquely identify the various activity entries stored in association with the user 110 in the user activity database 150. Accordingly, the program logic transmitted to the user computing device 112 or monitoring devices 122 may cause the unique user identifier to be packaged with any user activity information transmitted to the financial institution computing system 132. As a result, user activity information transmitted by the user computing device 112 and/or monitoring devices 122 may be efficiently stored in association with the user 110 upon receipt by the financial institution computing system 132.

In addition to providing various information interfacing logics, the software package may also include any of the elements of the alert delivery system 136 discussed above. For example, the software package may include, for example the profile generation circuit 138. In such arrangements, the user's mobile device may perform many of the remaining steps of the method 200. Additionally, the transmitted software package may also include the alert circuit 142 discussed above as well as portions of the content database 148. This way, upon the trigger monitoring circuit 140 detecting the occurrence of a user overspending trigger, an alert is generated directly by the user computing device 112.

User account information is retrieved at 210. In various example embodiments, the alert delivery system 136 (e.g., via the profile generation circuit 138) is structured to identify a payment account associated with the user 110 and retrieve information pertaining to the payment account from the account database 146. The alert delivery system 136 may identify the user account based on information received from the user at 206. For example, in arrangements, where the user inputs identifying information such as a name or user online banking credentials, the alert delivery system 136 may identify the account based on that information.

User baseline spending characteristics are identified at 212. As discussed above, based on the retrieved user account information, the alert delivery system 136 (e.g., via the profile generation circuit 138) may identify a baseline user spending level over a predetermined interval (e.g., weekly). Further, the alert delivery system 136 may also identify merchants at which the user shops at above a predetermined frequency (e.g., twice a week) and determine average transaction amounts at each of those merchants.

Deviations from the baseline spending characteristics are identified at 214. For example, the alert delivery system 136 may identify time periods (e.g., weeks) when the user has historically spent more than a predetermined percentage above the average spending amount determined at 212. Further, upon identifying such time periods, the alert delivery system 136 may further identify particular transactions that caused such an occurrence. For example, the alert delivery system 136 may identify a transaction or series of transactions at merchants not included in the common set of merchants identified at 212. Alternatively or additionally, the alert delivery system 136 may also identify transactions having an amount above the average transactions amount identified at 212. The timing and location (e.g., merchant) of such transactions may be recorded.

User activity information is received at 216. In various example embodiments, the alert delivery system 136 begins collection of user activity data upon configuration of the user computing device 112 at 208. As will be understood, a plurality of different forms of user activity data may be received depending on the level of permissions granted by the user 110. Among other forms of user activity information, the alert delivery system 136 may receive user location information, user social media information (e.g., posts, profile information such as user social media "friends," and the like), user biometric information (e.g., heartrate information, blood pressure information, and the like), other user activity information (e.g., user movement information such as steps and images of the user), and information pertaining to other users (e.g., location information of users associated with the user 110). In various example embodiments, the alert delivery system 136 may receive user activity information from a particular monitoring device 122 or other data source at a predetermined frequency (e.g., every minute, every hour, etc.) for a predetermined period (e.g., a month).

In some arrangements, each time user activity information is received, such information is used to populate the user activity database 150. As discussed above, the user activity database 150 may include a separate entry for the user 110. The user entry may include separate sub-entries for each type of user activity pertaining to the user 110 received. For example, if a monitoring device 122 transmits user heartrate information (e.g., describing an average user heart rate over a predetermined period) and user movement information (e.g., steps) to the financial institution computing system 132, the user activity database 150 may include two user sub-entries: one for user heartrate and another for user movement information. Each time the financial institution computing system 132 receives a set of information from the monitoring device 122 an entry indicating a user activity level and an associated time may be added to the entry in the user activity database 150.

In some examples, upon receipt of certain forms of user data, the alert delivery system 136 may perform an initial analysis of the received user data to ascertain user activity. For example, the financial institution computing system 132 may periodically receive images of the user 110 from a camera associated with the user computing device 112. Upon receipt of such an image, the alert delivery system 136 may assess the received image with an image processing algorithm to ascertain the relative positioning of various user facial features to project an emotional state of the user. Upon projecting the emotional state of the user, the emotional state may be recorded as part of an image analysis sub-entry in the user activity database 150 along with time stamp information. A similar process may be performed with regard to received user social medial information. For example, upon receiving information concerning a user social media post, the alert delivery system 136 may perform a linguistic analysis on the post to ascertain, for example, a topic of the user post. Upon determination of the topic of the post, the topic may be stored in a social media sub-entry of the user activity database 150.

User activity patterns are determined at 218. In various embodiments, the alert delivery system 136 performs an analysis on the received user activity data that is similar to what was performed on the user transaction history at 212. In other words, baseline user activity characteristics are determined. For example, if a user is in a particular location at consistent times over the course of a series of days or weeks, the alert delivery system 136 may identify those times and location as a baseline user activity characteristic. Average user heartrates, movement levels, and the like may also be determined over a predetermined period. Additionally, other users consistently located proximate to the user 110 may be identified. In this regard, the alert delivery system 136 may run a comparison of user location information received from the user computing device 112 with that of other registered users stored in the user activity database 150. For example, if another user is within a predetermined estimated distance from the user 110 for more than a predetermined period, that other user may be identified as being associated with the user.

Having identified user baseline activity characteristics, deviations from the user baseline activity characteristics may also be identified. For example, time periods where a user 110's location deviates from common user location information may be identified. Additionally, times when the user 110 is with another user may also be identified. Additionally, time periods where the user 110's heartrate and/or moving information are above/below the user 110's averages discussed above by more than a predetermined threshold are also identified.

A user spending profile is generated at 220. In various embodiments, the user spending profile includes a set of user spending triggers. As discussed above, user spending triggers may include sets of user activity data that bear a temporal relationship to user transactions and/or sets of transactions that caused the deviations from the user's baseline spending level identified at step 214. Accordingly, the alert delivery system 136 (e.g., by the profile generation circuit 138) compares the timing of various user overspending transactions identified at 214 to the timing of deviations from the user's baseline activity characteristics identified at 218. In various embodiments, if such timings sufficiently interrelate (e.g., are within a predetermined timing threshold of one another), the user activity deviation is identified as a user overspending trigger. For example, if a user overspending transaction took place during or close to a time when the user 110 was with another user, the alert delivery system 136 may identify being with that other user as an overspending trigger for the user 110.

Alternatively or additionally, the timing of various user overspending transactions may be compared with the timing of various baseline user activity characteristics to identify an overspending trigger. For example, the user 110 may regularly be in a particular location but only overspend there some of the time. In such a case, the user may still prefer to get an overspending alert even though a deviation from the user's baseline activity is not necessarily the cause of such overspending. As discussed above, each user activity identified as a user overspending trigger may be identified as such in the user activity database 150.

Figure 3:
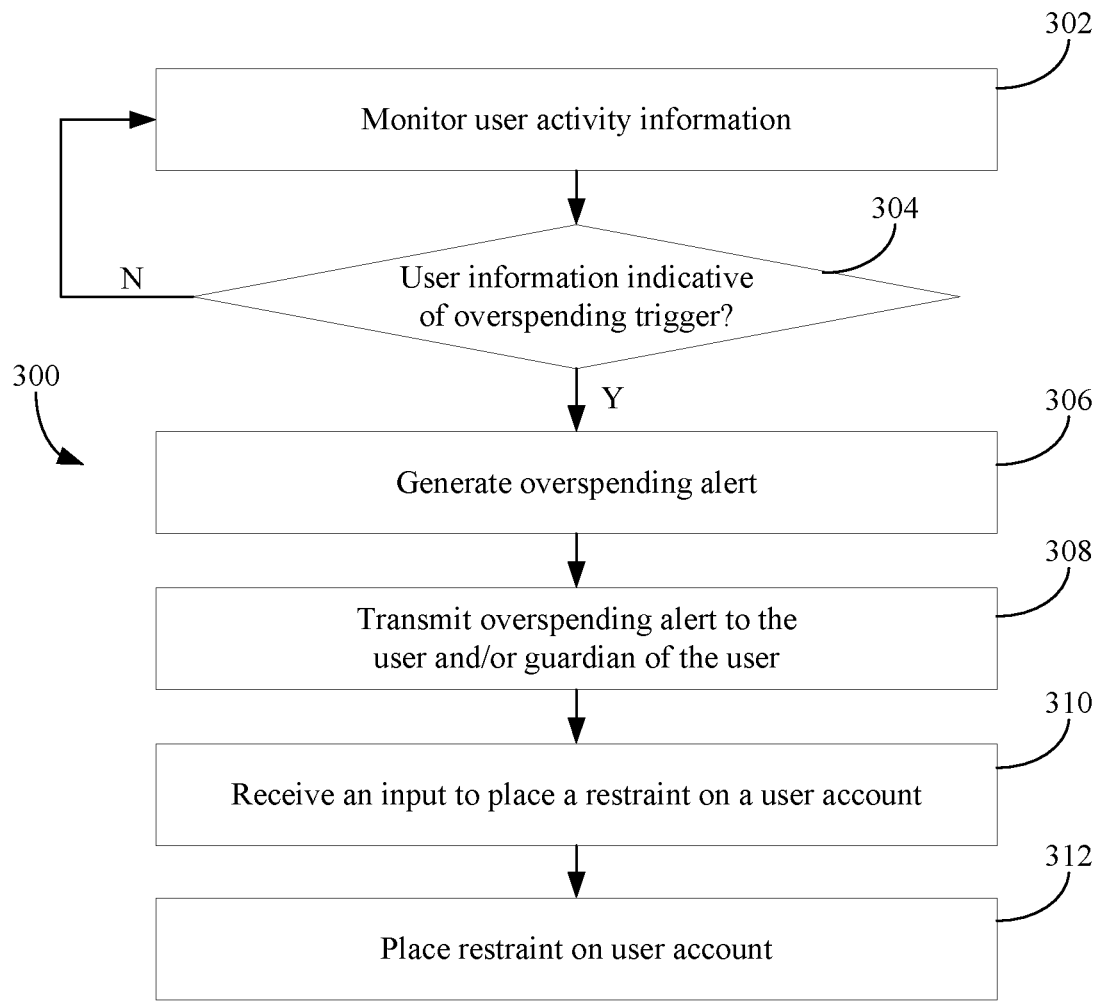
FIG. 3 is a flow diagram of a method of monitoring user activity information to determine when to transmit an overspending alert to the user, according to an example embodiment.

Referring now to FIG. 3, a flow diagram of a method 300 of monitoring the activity data of a user for an overspending trigger is shown, according to an example embodiment. The method 300 may be performed by the components of FIG. 1, such that reference may be made to one or more components of FIG. 1 to aid description of the method 300.

User activity information is monitored at 302. For example, the user computing device 112 and/or monitoring devices 122 may periodically transmit any of the various forms of user activity information discussed above to the financial institution computing system 132.

It is determined if the received user activity information is indicative of a user overspending trigger at 304. As or after the user activity information is received and stored in the user activity database 150, the alert delivery system 136 (e.g., via the trigger monitoring circuit 140) may compare the received user activity information to the user overspending triggers generated during the method 200 discussed above. In an example, upon the receipt of user location information from the user computing device 112, the alert delivery system 136 may compare the user's location to any locations identified as being a user overspending trigger. For example, if the user 110 is within a predetermined distance of a user overspending location, the alert delivery system 136 determines that the user 110 is likely to overspend. If, however, none of the overspending triggers identified during the method 200 discussed above are determined to be present, the method 300 reverts back to 302, and continues to monitor the user's activity information.

In some situations, the alert delivery system 136 may perform various forms analysis on the received user activity information to put received user activity data in a comparable form to the user overspending trigger. For example, if a particular user overspending trigger relates to a user emotional state gathered from an image of the user's face and the received user activity information constitutes an image of the user, an image analysis may be performed to project a user emotional state.

If the received user activity information is indicative of a user overspending trigger, an overspending alert is generated at 306. In various embodiment, the alert delivery system 136 (e.g., via the alert circuit 142) populates an alert message template with an alert message to produce a user alert. In some embodiments, the alert delivery system 136 retrieves an alert message from the content database 148 to produce the alert. The retrieved alert message may be based at least in part on the user overspending trigger identified at step 304. For example, the content database 148 may include a plurality of location names (e.g., merchants) stored in association with various location coordinates. Thus, in response to detecting that the user 110 is within a predetermined distance of a user overspending location, the alert circuit 142 may retrieve a location name associated with a set of coordinates that most closely matches the user activity data received at 302 to incorporate into the alert template. In another example, if the alert delivery system 136 identifies that the user is with another user, the alert circuit 142 may incorporate the name of the other user into the alert message.

In some arrangements, the generated user alert may include various predetermined datasets that are configured to induce a response when received by the user computing device 112. For example, the alert may be in the form of a push notification configured to activate the banking client application 118. In some arrangements, the user alert may configure the banking client application 118 to present the user 110 with an interface including the alert message as well as various other graphics. The other graphics may enable the user 110 to place a restriction on a user account at the financial institution 130. For example, one graphic may include a button that enables the user to place a temporary hold on the user payment account. Another graphic may allow the user to set a temporary spending limit on the user payment account. Additionally, the alert circuit 142 may retrieve a unique user identifier associated with the user 110 from the account database 146 and incorporate the unique user identifier into the alert.

The overspending alert is transmitted to the user 110 or a person associated therewith at 308. In some embodiments, the alert generated at 306 is transmitted to a push notification service which, using the unique user identifier included in the alert, directs the alert to the user computing device 112. In some embodiments, the alert is transmitted directly to the user computing device 112.

In some embodiments, the alert may be transmitted to someone other than the user. For example, when registering for the alert program offered by the financial institution 130, the user 100 may have indicated another individual to direct the overspending alerts to. A unique user identifier associated with a device (e.g., similar to the user computing device 112) associated with the indicated individual may also be stored in the account database 146. The unique user identifier associated with such an individual may be incorporated into the alert and transmitted to the device using any of the methods described above.

An input to place a restraint on a user account is received at 310. As discussed above, the alert transmitted at 308 may be specifically formatted such that, when the alert message is received by the user computing device 112, a call for a particular function of the banking client application 118 is made by the program logic of the user computing device 112. The called function may cause the user to be brought to a specific interface of the banking client application 118 upon a user interaction with the alert message. The interface may include various graphics configured to receive an input to place a restriction on a user payment account at the financial institution 130. Upon selection of such a graphic, the user 110 may be brought to an additional interface enabling the user to input various preferences as to the restriction (e.g., length of time, amount of spending, and the like). Upon the user 110 indicating such preferences, the user preferences may be transmitted to the alert delivery system 136 over the network 160.

A restriction is placed on the user account at 312. In various embodiments, the alert delivery system 136 (e.g., via the restriction circuit 144) places a hold on a user payment account. For example, the restriction circuit 144 may transmit a deactivation identifier to the account database 146 to prevent a payment processing circuit (not shown) of the financial institution computing system 132 from authorizing any payment requests within a user-input time period. Upon the time period lapsing, the restriction circuit 144 may remove the deactivation indicator so as to allow the user 110 to make payment using the payment account once again. In various other situations, the restriction circuit 144 may take various actions to place a temporary spending limit on the user's account. For example, the restriction circuit 144 may continuously retrieve balance information associated with a user account from the account database 146 and identify any changes in the balance from when the user set the spending limit. The restriction circuit 144 may compare the balance change to the spending limit and, if the change meets or exceeds the spending limit, the restriction circuit 144 may place a temporary hold on the user account using the methods discussed above. Thus, not only is the user alerted to a potential of overspending, but the user is provided with the ability to proactively prevent such overspending by placing a restriction on the user's account.

Figure 4:
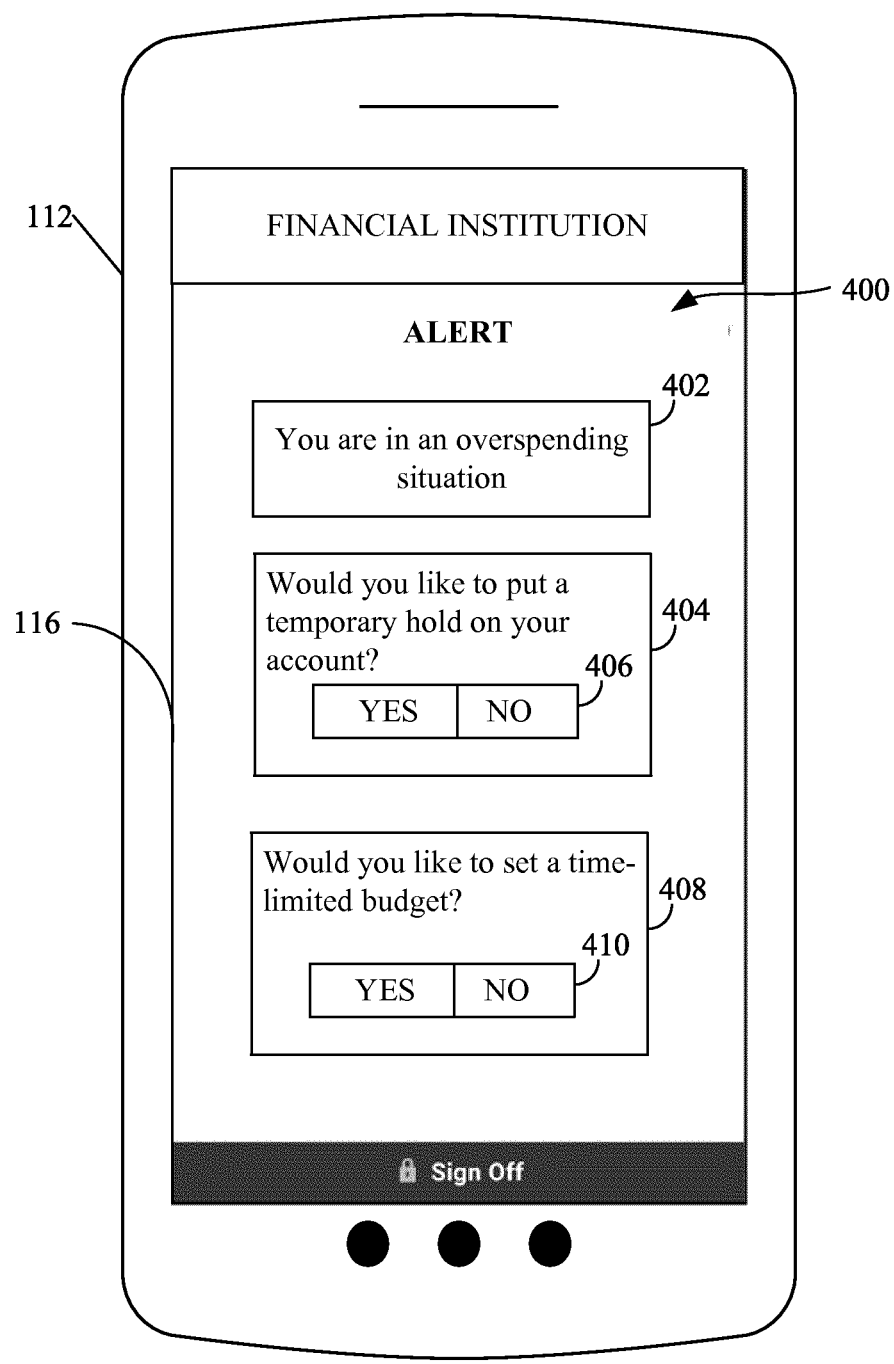
FIG. 4 is an example alert interface presented to the user via a user computing device, according to an example embodiment.

Referring now to FIG. 4, an example alert interface 400 is shown, according to an example embodiment. In some arrangements, the alert interface 400 is presented to the user 110 responsive to the user 110 interacting with an alert notification received by any of the methods discussed above. For example, the alert notification may be in the form of a push notification that shows up on a main screen of the user computing device 112 irrespective of the application currently being run by the user computing device 112. However, as discussed above, the notification may be configured with a link to the banking client application 118 such that, upon the user interacting (e.g., pressing a portion of the user I/O device 116 that corresponds to the notification) with the notification, the user is brought to the interface 400.

As shown, the interface 400 includes an alert message 402, an account hold window 404, and a budgeting window 408. The alert message 402 informs the user that an overspending trigger has been detected. While the alert message 402 is generic, it should be understood that in various other embodiments the alert message 402 may be more specifically tailored to the detected user circumstances. For example, the alert message 402 references the particular overspending trigger (e.g., location, other user, emotional state, activity level, and the like) that lead to the transmission of the alert. The account hold window 404 is configured to receive a user preference to put a temporary hold on the account. The account hold window includes a hold-preference portion 406 configured to receive a user preference to place a temporary hold on a user payment account at the financial institution 130. Upon the user interacting with the hold-preference portion 406, the user provides an input to program logic (e.g., associated with the banking client application 118) being executed by a processor of the user computing device 112. In some arrangements, in response to receiving a user input to place a temporary hold on the account, the user computing device 112 presents the user with another interface enabling the user to input various preferences (e.g., regarding the length) with respect to a temporary hold on the account. Similarly, the budgeting window also includes a budget-preference portion 410 configured to receive user inputs to place a temporary spending limit on the user account.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U. S. C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated.

Other substitutions, modifications, changes and omissions may be made in the design, operating conditions and arrangement of the embodiments without departing from the scope of the present disclosure as expressed in the appended claims.

What is claimed is:

1. A financial institution computing system associated with a financial institution, the system comprising:
   a network interface structured to communicate data over a network;
   a user database configured to store information related to a plurality of users, including information pertaining to a user payment account associated with a user and historical user activity information pertaining to the user, the historical user activity information pertaining to the user being stored in association with a unique user identifier; and
   a processing circuit comprising a processor and a memory, the memory structured to store instructions that are executable by the processor and cause the processor to:
      retrieve a user transaction history associated with the user payment account from the user database;
      determine a baseline level of user spending based on the user transaction history;
      receive, by the network interface, user activity information pertaining to the user, the user activity information continuously gathered by a user computing device, the user activity information comprising non-financial activity;
      determine that the non-financial activity is indicative of a potential transaction that is above the baseline level of user spending, wherein the baseline level of user spending includes an amount of user spending over a predetermined period, wherein the processor is further caused to determine a timing of a user overspending period in which the user's level of spending is above the baseline level of user spending by more than a predetermined amount;
      generate a user activity profile based on the historical user activity information, the user activity profile including a plurality of sets of user activity information;
      identify a set of activity information in the plurality of sets having a timing that bears a relationship to the timing of the user overspending period, wherein determining that the non-financial activity is indicative of the potential transaction is based on the relationship;
      generate and transmit, by the network interface, to the user computing device associated with the user, an alert, the alert responsive to determining that the potential transaction is above the baseline level of user spending, the alert formatted to activate a client application on the user computing device and cause an updated interface to display on the user computing device in response to a first user interaction with the alert, the updated interface displaying the set of activity information identified in the user activity profile; and
      place a time-limited budget restriction on the user payment account based on a second user interaction with the alert, the time-limited budget restriction comprising a threshold and a definite time period, the time-limited budget restriction configured to prevent the user payment account from completing transactions above the threshold during the definite time period.

2. The system of claim 1, wherein the processor is further caused to:
   receive a request to register for an alert program from the user computing device;
   transmit, by the network interface, a registration interface to the user computing device, the registration interface including a query asking permission to access user activity information;
   receive permission to access user activity information captured by the user computing device or a user monitoring device associated with the user; and
   transmit, by the network interface, a set of instructions to either the user computing device or the user monitoring device, the set of instructions causing user activity information to be transmitted to the financial institution computing system in combination with the unique user identifier.

3. The system of claim 2, wherein the received user activity information includes at least one of user social media information, user location information, user biometric information, and an image of the user.

4. The system of claim 2, wherein the received user activity information includes user location information as well as location information received from a computing device associated with another user.

5. The system of claim 1, wherein the alert is a push notification structured to cause an alert interface to be presented on the user computing device, the alert interface including an account restriction feature configured to receive a user input to place a restriction on the user payment account.

6. The system of claim 5, wherein the processor is further caused to:
   receive, by the network interface, the user input to place the restriction on the user payment account; and
   place the restriction on the user payment account.

7. The system of claim 6, wherein the restriction includes at least one of temporarily deactivating the user payment account and placing a spending limit on the user payment account over the predetermined period.

8. A computer-implemented method, comprising:
   retrieving, by a financial institution computing system associated with a financial institution, a user transaction history associated with a user payment account associated with a user from a database;
   determining, by the financial institution computing system, a baseline level of user spending based on the user transaction history;
   receiving, by the financial institution computing system, user activity information pertaining to the user, the user activity information continuously gathered by a user computing device, the user activity information comprising non-financial activity;
   determining, by the financial institution computing system, that the non-financial activity is indicative of a potential transaction that is above the baseline level of user spending, wherein the baseline level of user spending includes an amount of user spending over a predetermined period, wherein the method further comprises determining, by the financial institution computing system, a timing of a user overspending period in which the user's level of spending is above the baseline level of user spending by more than a predetermined amount; and
   generating a user activity profile based on historical user activity information, the user activity profile including a plurality of sets of user activity information;
   identifying a set of activity information in the plurality of sets having a timing that bears a relationship to the timing of the user overspending period, wherein determining that the non-financial activity is indicative of the potential transaction is based on the relationship;
   generating and transmitting, by the financial institution computing system to the user computing device associated with the user, an alert, the alert responsive to determining that the potential transaction is above the baseline level of user spending, the alert formatted to activate a client application on the user computing device and cause an updated interface to display on the user computing device in response to a first user interaction with the alert, the updated interface displaying the set of activity information identified in the user activity profile; and
   receiving, from the user computing device via a second user interaction with the alert, a request to place a budget restriction on the user payment account for a definite amount of time, the budget restriction configured to prevent the user payment account from completing an over-budget transaction within the definite amount of time.

9. The method of claim 8, further comprising:
   receiving, by the financial institution computing system, a request to register for an alert program from the user computing device;
   transmitting, by the financial institution computing system, a registration interface to the user computing device, the registration interface including a query asking permission to access user activity information;
   receiving, by the financial institution computing system, permission to access user activity information captured by the user computing device or a user monitoring device associated with the user; and
   transmitting, by the financial institution computing system, at set of instructions to either the user computing device or the user monitoring device, the set of instructions causing the user activity information to be transmitted to the financial institution computing system for storage in the database in association with a unique user identifier associated with the user.

10. The method of claim 9, wherein the received user activity information includes at least one of user social media information, user location information, user biometric information, and an image of the user.

11. The method of claim 9, wherein the received user activity information includes user location information as well as location information received from a computing device associated with another user.

12. The method of claim 8, wherein the alert is a push notification structured to cause an alert interface to be presented on the user computing device, the alert interface including an account restriction feature configured to receive a user input to place a restriction on the user payment account.

13. The method of claim 12, further comprising:
   receiving, by the financial institution computing system, a user input to place the restriction on the user payment account; and
   placing, by the financial institution computing system, the restriction on the user payment account.

14. The method of claim 13, wherein the restriction includes at least one of temporarily deactivating the user payment account and placing a spending limit on the user payment account over the predetermined period.

15. A non-transitory computer-readable media having computer-executable instructions embodied therein that, when executed by a processor of a financial institution computing system associated with a financial institution, causes the financial institution computing system to perform operations to transmit an overspending alert to a user, the operations including:

retrieving a user transaction history associated with the user payment account from a database;

determining a baseline level of user spending based on the user transaction history;

receiving user activity information pertaining to the user from a user computing device, the user activity information continuously gathered by the user computing device, the user activity information comprising non-financial activity;

determining that the non-financial activity is indicative of a potential transaction that is above the baseline level of user spending, wherein the baseline level of user spending includes an amount of user spending over a predetermined period, wherein the method further comprises determining, by the financial institution computing system, a timing of a user overspending period in which the user's level of spending is above the baseline level of user spending by more than a predetermined amount; and generating a user activity profile based on historical user activity information, the user activity profile including a plurality of sets of user activity information;

identifying a set of activity information in the plurality of sets having a timing that bears a relationship to the timing of the user overspending period, wherein determining that the non-financial activity is indicative of the potential transaction that is above the baseline level of user spending is based on the relationship;

generating and transmitting an alert to the user computing device associated with the user responsive to determining that the potential transaction is above the baseline level of user spending, the alert formatted to activate a client application on the user computing device and cause an updated interface to display on the user computing device in response to a first user interaction with the alert, the updated interface displaying the set of activity information identified in the user activity profile; and place a time-limited budget restriction on the user payment account based on a second user interaction with the alert.

16. The non-transitory computer-readable media of claim 15, wherein the alert is a push notification structured to cause an alert interface to be presented on the user computing device, the alert interface including an account restriction feature configured to receive a user input to place a restriction on the user payment account.

17. The non-transitory computer-readable of claim 15, wherein placing the time-limited budget restriction on the user payment account based on the second user interaction with the alert comprises the steps of:

receiving, via the alert, a threshold amount and a definite time period, and prevent the user payment account from completing a transaction above a threshold within a definite amount of time.

* * * * *